United States Patent

[11] 3,633,882

| [72] | Inventors | Kouichi Karakawa<br>Wada, Tamano;<br>Shogo Tanigawa, Chikuko, Wada, Tamano, both of Japan |
|---|---|---|
| [21] | Appl. No. | 844,059 |
| [22] | Filed | July 23, 1969 |
| [45] | Patented | Jan. 11, 1972 |
| [73] | Assignee | Mitsui Shipbuilding & Engineering Co., Ltd.<br>Tokyo, Japan |
| [32] | Priority | Oct. 8, 1968 |
| [33] | | Japan |
| [31] | | 43/73307 |

[54] VAPOR-LIQUID CONTACTING APPARATUS
9 Claims, 10 Drawing Figs.

[52] U.S. Cl. .................................................. 261/113,
261/114n, 55/257
[51] Int. Cl. ..................................................... B01d 3/26
[50] Field of Search........................................... 55/223,
240, 257, 255, 256; 261/112, 113, 114

[56] References Cited
UNITED STATES PATENTS

| 548,174 | 10/1895 | Bradburn .................. | 261/113 |
| 1,366,956 | 2/1921 | Schneible .................. | 261/114 |
| 1,608,416 | 11/1926 | Newton ..................... | 261/114 |
| 1,904,380 | 4/1933 | Morrell et al. ............. | 261/114 |
| 1,920,437 | 8/1933 | Sillers ....................... | 55/255 |
| 1,973,141 | 9/1934 | Clarke ...................... | 261/114 |
| 2,484,205 | 10/1949 | Candler .................... | 261/114 X |
| 2,871,003 | 1/1959 | Galbreath ................. | 261/114 |

*Primary Examiner*—Frank W. Lutter
*Assistant Examiner*—Steven H. Markowitz
*Attorney*—Howson and Howson

ABSTRACT: A gas-liquid contacting apparatus provided with vertically spaced trays having gas-flow openings therein and a contacting structure provided on the trays, the contacting structure comprising cylindrical walls surrounding said openings and secured to the trays and having apertures at a lower portion thereof. A perforated cylinder is provided atop of the cylindrical wall, and a cover. Liquid is maintained on the tray by a weir means and is discharged through the apertures of said cylindrical wall into the gas-flow opening and is blown up by gas ascending from the openings of the tray to form gas-liquid mixing flow. Suitable flow control means are disclosed for the gas and the liquid respectively.

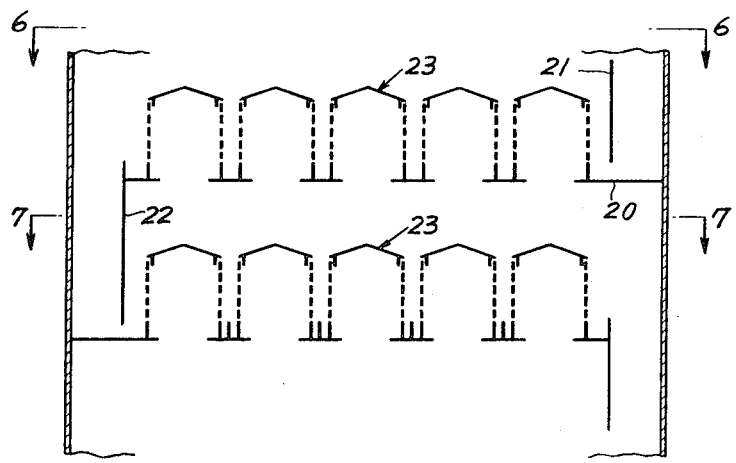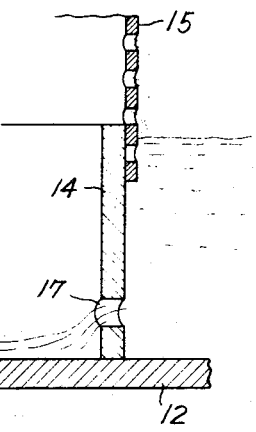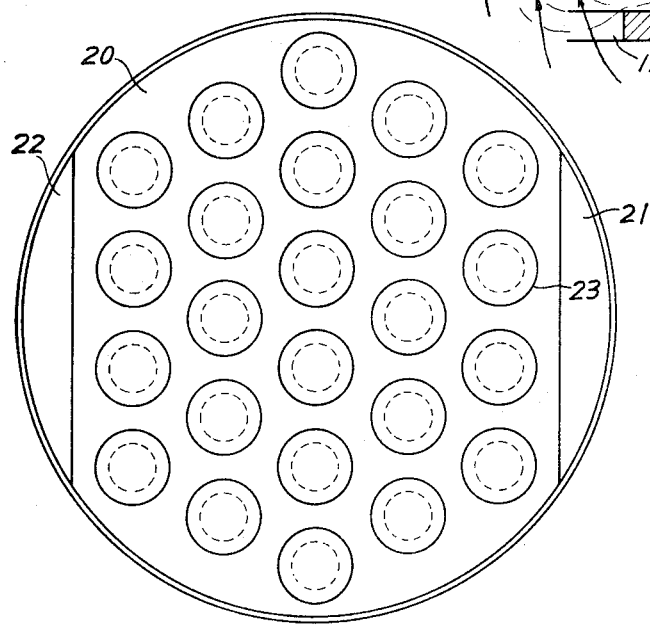

Inventors:
Kouicha Karakawa
Shogo Tanigawa
by Howson & Howson Attys.

VAPOR-LIQUID CONTACTING APPARATUS

This invention relates to vapor-liquid contacting apparatus for heat or mass transferring such as distillating apparatus or absorption apparatus in the chemical industry.

In recent years, the vapor-liquid contacting apparatus has been increased in size, and it has been proposed to provide various types of apparatus, for example, a bubble cap column or a sieve plate column.

In these apparatus it has been tried to improve on (1) increase of treatment capacity, (2) increase of contacting efficiency, (3) decrease of pressure loss, (4) increase of stable operating range and (5) curtailment of manufacturing cost. However, these apparatus comprise such a vapor-liquid contacting mechanism that vapor is injected into the liquid stayed on the tray or plate, which gives only negative results to the above-mentioned five ends of improvement.

More specifically, the bubble cap column is ineffective to the ends of above matters (1), (3) and (5), and the sieve plate column is ineffective to the matter (4) and especially to the matters (1) and (2) when an apparatus of low pressure loss are desired. Further, various kinds of valve tray which have been often used in recent year are difficult to accomplish the ends of the matters (2), (3) and (5). In addition, in accordance with these apparatus treatment capacity can not be increased more than 30 to 50 percent at the most.

Therefore, an object of this invention is to provide an apparatus which can fulfil the above-mentioned five conditions.

In accordance with this invention, the liquid fallen from a plate is blown up by the ascending gas or vapor to form vapor liquid mixing phase flow, the flow is then inverted by a top cover and passed through holes of a vertically provided perforated plate to be separated into vapor and liquid. Vapor and liquid contact is performed during the vapor liquid mixing phase flow and while passing through the small holes of the perforated plate.

In the drawings:

FIG. 4 is an enlarged sectional view of the encircled part shown by the numeral 4 in FIG. 1;

FIG. 5 is a vertical sectional view showing another embodiment of this invention;

FIG. 6 is a sectional view taken on line 6—6 in FIG. 5;

Figure 1:
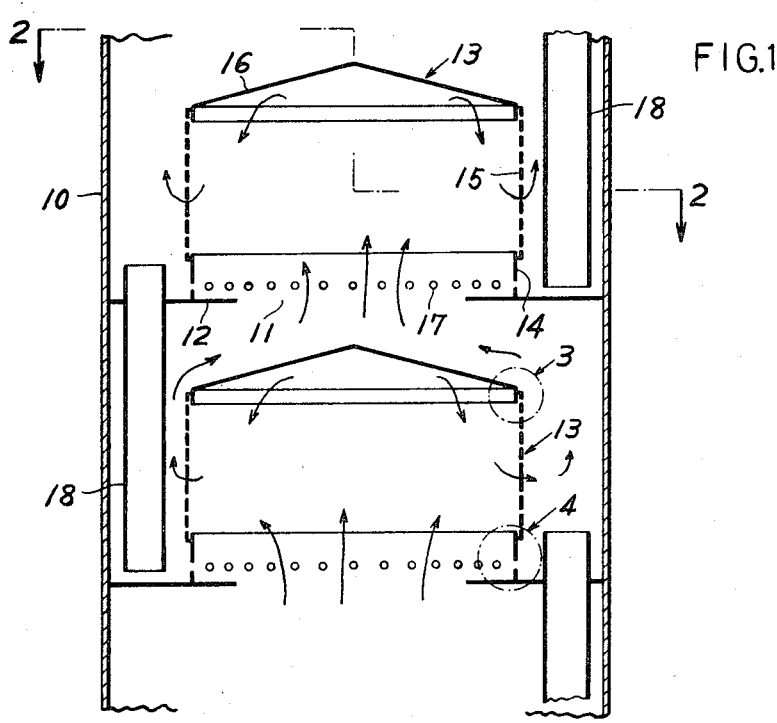
FIG. 1 is a vertical sectional view of the vapor-liquid contacting apparatus made in accordance with this invention.
Figure 2:
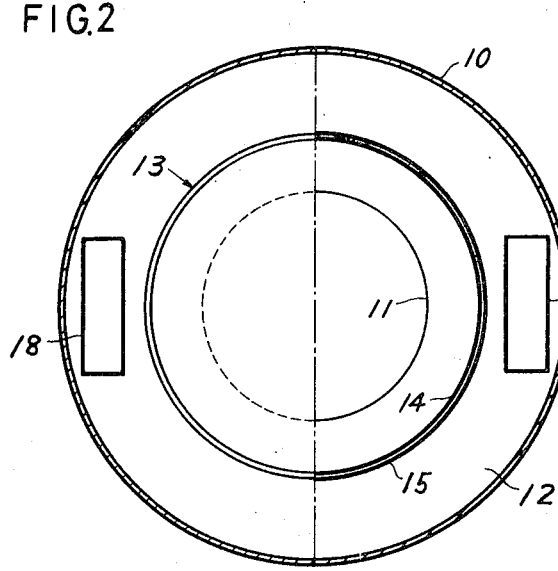
FIG. 2 is a sectional view taken on line 2—2 in FIG. 1.
Figure 3:
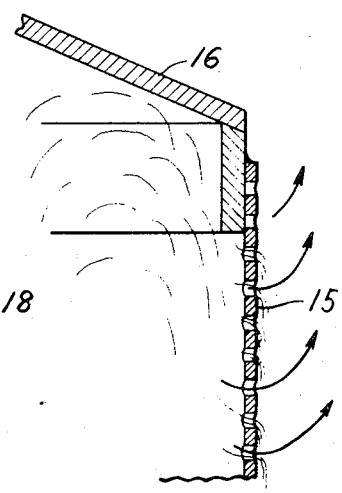
FIG. 3 is an enlarged sectional view of the encircled part shown by the numeral 3 in FIG. 1.

Referring to the drawing, and particularly to FIGS. 1 to 4 thereof, plates 12 having holes 11 at the center thereof are provided in the column 10 at a suitable space. On each plate is provided with a cap-shaped vapor-liquid contacting construction 13, which comprises a cylindrical weir 14 secured on the plate 12 and having plurality of holes 17 arranged in a line, a cylindrical perforated plate 15 such as a punching plate secured to the weir 14, and a cover 16. The plate 12 is also provided with a downcomer 18 at the outside of the construction 13, the downcomer 18 projecting upwardly on the plate 12 is a suitable height and the lower end of the downcomer being near the lower plate. Each downcomer is arranged in alternate position at every plate.

Liquid on the plate 12 overflows the top of the downcomer 18 and flows down along the inside wall thereof. The liquid is stayed on the plate at a height determined by height of the downcomer 18 and the weir 14 and passed by the head through the holes 17 and weir 14, and further falls through the hole 11 of the plate 12. Since vapor ascends through the hole 11, the liquid which is going to fall from the hole 11 is upwardly blown by the vapor to be formed into the vapor liquid mixing phase flow. The vapor-liquid liquid mixing flow is inverted by the cover 16 and passes through the holes of the perforated plate 15. The vapor which has passed through the holes of the perforated plate ascends, and the liquid in a state of mist is collected when passes through the holes and grown into a drop or flow, and thus the liquid flows down along the outside of the perforated plate 15. The vapor ascends toward the hole 11 of the upper plate and the liquid stayed on the lower plate. Thus the liquid is circulated unless the liquid overflows the top of the downcomer or falls from the hole 11. Therefore the liquid is contacted enough with the vapor.

Figure 7:
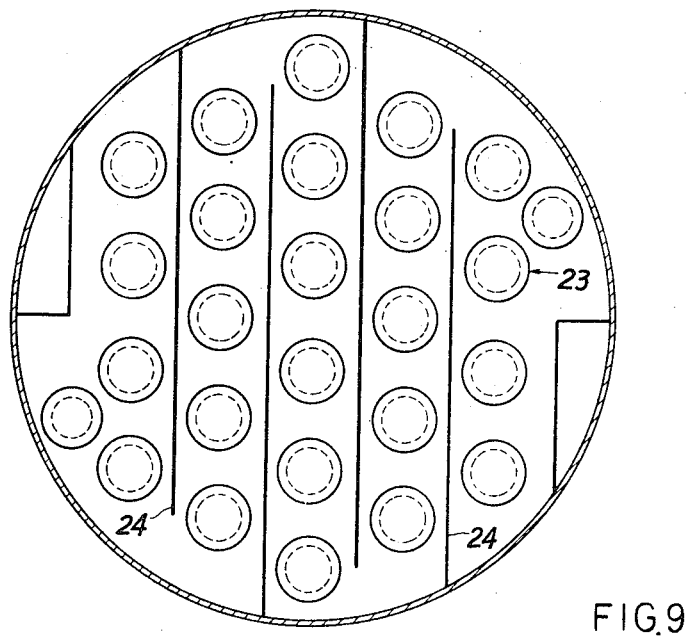
FIG. 7 is a sectional view taken on line 7—7 in FIG. 5.

The apparatus shown in FIGS. 5 to 7 is provided with a plurality of the above-mentioned vapor-liquid contacting constructions on the same plate. At the one side of the plate, a downcomer 21 from the upper plate is provided and a downcomer 22 therefrom is provided at the other side. The vapor-liquid contacting constructions 23 are provided between the downcomers. It is desirable to provide a guiding means for the flow of liquid on the plate in this apparatus. To this end guiding plates 24 are provided on the plate to form a zigzag passage to elongate the length of the way.

It is important in design of this apparatus to balance the quantity of liquid flow through the holes 17 by rate of vapor ascending through the hole 11. That is, if the balance is not held, the liquid is not circulated, but stayed on the plate or fallen (so called weeping) from the hole 11.

It has been confirmed by experiment of this apparatus that even if the quantity of liquid to be treated is three times as great as that of normal condition, stable operation may be performed without weeping of the liquid through the hole 11. On the other hand, there is also upper limit to the treated quantity because increase of the quantity causes the rate of vapor to increase to entrain the liquid on the vapor, which results in decrease of vapor-liquid contacting efficiency. In the prior art, since the vapor upwardly blows through the liquid stayed on the plate, it is liable to entrain the liquid on the vapor. In the apparatus in accordance with this invention, the vapor inverted by the cover 16 downwardly or horizontally passes through the holes of the perforated plate 15, thus the entrainment may be reduced to the minimum. This means that the apparatus in accordance with this invention is possible to treat a great quantity. Further, in the conventional apparatus, ratio of hole area of the sieve plate to sectional area of the column is limited in order to prevent weeping of liquid therefrom, and the ratio is generally 5–15 percent. On the contrary, in this apparatus in accordance with this invention, the ratio of hole area can be increased to 15–40 percent without consideration for weeping of liquid, because perforated plate as sieve plate is vertically provided. Therefore, if the treated quantity is increased, pressure loss is not increased.

Figure 8:
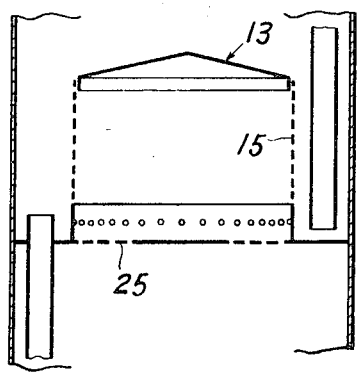
FIGS. 8 to 10 are vertical sectional views showing other embodiments of this invention respectively.

In the apparatus shown in FIG. 8, the hole 11 in FIG. 1 is covered by a partially perforated plate 25. In accordance with this apparatus, the vapor contacts with the liquid while passing the holes of the plate 25 and flowing in vapor-liquid mixing phase in the space in the cylindrical perforated plate 15. Thus the contacting efficiency is more raised. In addition, since the weeping of liquid is of course reduced, range of the stable operation may be enlarged.

Figure 9:
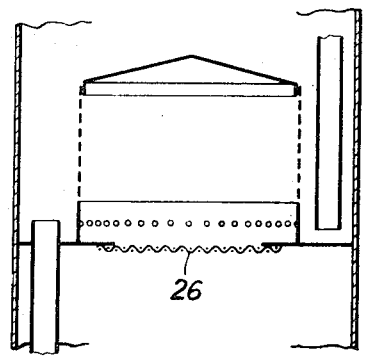
Figure 10:
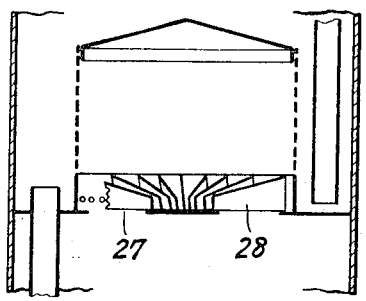

The apparatus in FIG. 9 is provided with a wire netting 26 having a ratio of hole area of 15–50 percent in order to reduce the weeping of liquid. In the apparatus shown in FIG. 10, inclined plates 28 are radially provided over the circular hole 27 of the plate 12 at regular intervals in order to cause the ascending vapor to rotate. Thus the vapor-liquid mixing phase flow is directly blown against the perforated plate 15, which is possible to reduce the pressure loss.

The distance between the plates 12 is determined by the rate of vapor passing through the holes of the perforated plate 15. In embodying this invention, if the hole of the perforated plate 15 is of 2.0 mm. in diameter and the pitch thereof is 3.0 mm., the ratio of the hole area becomes 40 percent as great as the ratio of area of the hole 11. Therefore the distance between the plates may be designed less than 500 mm. even if in a large column for great quantity. Thus height of the column is decreased; this means that the apparatus in accordance with this invention may be cheaply manufactured.

From the foregoing, it will be observed that this invention provides a novel apparatus which has many advantages, such as to have great ratio of hole area, high vapor rate, flexibility for wide change of the quantity of vapor, stability of operation having no relation to the quantity of liquid, decreasing of the entrainment of liquid, and low pressure loss. As to economical advantage, for example when pressure loss is 3.5 mm. Hg per one plate, the diameter of the column in the conventional sieve plate column is 5.3 m. and that of bubble cap column is 6.4 m., but this invention is possible to construct the column of 4.0 m. in diameter at 3.0 mm. Hg per one plate, which results in cutting down the producing cost.

We claim:

1. A gas-liquid contacting apparatus comprising an upright column in which the gas flows upwardly, at least one tray mounted transversely in said column and having means for maintaining liquid thereon at a predetermined depth and a gas-flow opening therein, upwardly through which the gas is adapted to flow, contacting structure surrounding said opening comprising a cylindrical wall projecting upwardly from said tray and having apertures at a lower position below said predetermined depth of liquid to permit discharge of the liquid from the tray therethrough, a cylinder mounted coaxially on said cylindrical wall having perforations above said predetermined depth to permit gas flow therethrough, and a cover on said perforated cylinder, said structure being designed so that the liquid from said tray discharged through said apertures is blown up by the gas ascending through the gas-flow opening of the tray, the desired gas-liquid contact being effected within said perforated cylinder above said apertures.

2. A gas-liquid contacting apparatus according to claim 1 wherein said cylindrical wall projects upwardly above said predetermined depth.

3. A gas-liquid contacting apparatus according to claim 1 wherein said tray has a plurality of gas-flow openings therein and including contacting structure surrounding each opening.

4. A gas-liquid contacting apparatus according to claim 1 including a series of radial vanes associated with said opening to cause the ascending gas to whirl outwardly against the perforated cylinder.

5. A gas-liquid contacting apparatus according to claim 1 including wire netting spanning across said gas-flow opening to impede the downward migration or "weeping" of the liquid discharged through said apertures.

6. A gas-liquid contacting apparatus according to claim 1 including a series of trays mounted transversely in said column in vertically spaced relation, said means for maintaining the liquid at a predetermined level upon each tray including downcomer means to transfer liquid from an upper tray to the next lower tray and arranged so that the gas does not flow upwardly through said downcomer means.

7. A gas-liquid contacting apparatus according to claim 6 wherein the downcomer means for the next lower tray is positioned at the opposite side of the column from the downcomer means for the upper tray, and including guiding plates upstanding in said next lower tray to direct the liquid in a circuitous path across said tray from said upper downcomer means to said next downcomer means.

8. A gas-liquid contacting apparatus according to claim 7 wherein said next lower tray has a plurality of gas-flow apertures therein arranged in a series along said circuitous path, each said aperture having a contacting structure associated therewith.

9. A gas-liquid contacting apparatus according to claim 1 wherein said upstanding cylindrical wall surrounding said aperture is spaced outwardly from said apertures to provide an inwardly projecting edge, across which the liquid discharged through said apertures flows before it is blown up by said ascending gas flow.

* * * * *